(12) United States Patent
Mytelka et al.

(10) Patent No.: US 10,282,962 B2
(45) Date of Patent: *May 7, 2019

(54) METHOD, COMPUTER PROGRAM, AND SYSTEM FOR MONITORING A BEING

(71) Applicants: Robert Mytelka, Spring Valley, NY (US); Jim Heins, Brentwood, TN (US); Stuart Zakon, Spring Valley, NY (US); Joe Goldman, Ramat Beit Shemesh (IL)

(72) Inventors: Robert Mytelka, Spring Valley, NY (US); Jim Heins, Brentwood, TN (US); Stuart Zakon, Spring Valley, NY (US); Joe Goldman, Ramat Beit Shemesh (IL)

(73) Assignee: Lech Smart Home Systems LLC, Chestnut Ridge, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/977,817

(22) Filed: May 11, 2018

(65) Prior Publication Data

US 2018/0261065 A1  Sep. 13, 2018

Related U.S. Application Data

(63) Continuation of application No. 15/484,853, filed on Apr. 11, 2017, now Pat. No. 9,997,044.

(60) Provisional application No. 62/322,073, filed on Apr. 13, 2016.

(51) Int. Cl.
| | | |
|---|---|---|
| *H04M 3/51* | (2006.01) | |
| *G08B 21/04* | (2006.01) | |
| *G08B 25/08* | (2006.01) | |
| *G08B 25/10* | (2006.01) | |
| *G08B 29/18* | (2006.01) | |
| *H04M 11/04* | (2006.01) | |

(52) U.S. Cl.
CPC ..... *G08B 21/0423* (2013.01); *G08B 21/0469* (2013.01); *G08B 21/0492* (2013.01); *G08B 25/08* (2013.01); *G08B 25/10* (2013.01); *G08B 29/188* (2013.01); *H04M 3/5116* (2013.01); *H04M 11/04* (2013.01)

(58) Field of Classification Search
None
See application file for complete search history.

(56) References Cited

U.S. PATENT DOCUMENTS

| 5,406,073 | A * | 4/1995 | Sharp | G01V 8/10 |
| | | | | 250/221 |
| 9,612,862 | B2 * | 4/2017 | Faaborg | G06F 9/46 |
| 2013/0234625 | A1 * | 9/2013 | Kondo | H05B 37/0227 |
| | | | | 315/313 |
| 2014/0121540 | A1 * | 5/2014 | Raskin | A61B 5/6898 |
| | | | | 600/479 |

(Continued)

*Primary Examiner* — Fekadeselassie Girma
(74) *Attorney, Agent, or Firm* — Ansel M. Schwartz

(57) ABSTRACT

A method, computer program, and system for monitoring a person in a structure having a first room and a second room. The system includes motion sensors and accelerometers to determine states and activities within the states, respectively. No visual images of any type are used to monitor the person. The person does not need to wear any type of equipment or component or necklace or bracelet or special clothing with any type of equipment or component in order to be monitored by the system.

15 Claims, 9 Drawing Sheets

(56) References Cited

U.S. PATENT DOCUMENTS

| | | | |
|---|---|---|---|
| 2014/0265359 A1* | 9/2014 | Cheng | G07C 9/00571 292/144 |
| 2014/0266791 A1 | 9/2014 | Lloyd et al. | |
| 2014/0356495 A1* | 12/2014 | Teuscher | F24C 7/082 426/231 |
| 2016/0040469 A1* | 2/2016 | Lietz | E05F 15/668 49/13 |
| 2016/0189502 A1* | 6/2016 | Johnson | G07C 9/00571 348/155 |
| 2016/0210844 A1* | 7/2016 | Kim | G08B 25/10 |
| 2016/0217664 A1 | 7/2016 | Bradford | |
| 2016/0343181 A1* | 11/2016 | Cheng | G07C 9/00007 |
| 2017/0108236 A1* | 4/2017 | Guan | G05B 19/04 |
| 2017/0116483 A1* | 4/2017 | Richardson | G06K 9/00771 |
| 2017/0117108 A1* | 4/2017 | Richardson | H05B 37/0236 |
| 2017/0138111 A1* | 5/2017 | Lietz | E05F 15/668 |
| 2017/0193789 A1* | 7/2017 | Economy | F24F 11/30 |
| 2017/0210282 A1* | 7/2017 | Rodriguez Barros | G03B 21/00 |
| 2017/0235954 A1* | 8/2017 | Kurupati | G06F 21/566 726/23 |
| 2017/0243458 A1* | 8/2017 | Langford | G08B 5/36 |
| 2017/0260783 A1* | 9/2017 | Crolley | E05D 3/04 |
| 2017/0309160 A1* | 10/2017 | Lamb | G08B 25/10 |

\* cited by examiner

FIRST SCREEN–HEALTH SUMMARY–IN BEDROOM STATE

SENDING ALERT SCREEN-FOR THE DAY  FIG.4

FIG.5 SENDING ALERT SCREEN-FOR THE WEEK

POPUP SCREEN FROM HEALTH SCORE DETAIL SCREEN² FIG.6

Schedule of Activities for (Name of Client) _____

| Activity | Approximate Times | | Frequency / Duration | | | Acceptable Deviation | | | Sun | Mon | Tue | Wed | Thu | Fri | Sat |
|---|---|---|---|---|---|---|---|---|---|---|---|---|---|---|---|
| | From AM/ PM | To AM/ PM | # | Hrs | Mins | # | Hrs | Mins | (check all that apply) | | | | | | |
| Sleep 1 | | | | | | | | | | | | | | | |
| Sleep 2 | | | | | | | | | | | | | | | |
| Nap 1 | | | | | | | | | | | | | | | |
| Nap 2 | | | | | | | | | | | | | | | |
| | | | | | | | | | | | | | | | |
| Meals: (In or of Residence) | | | | | | | | | | | | | | | |
| Breakfast in / out | | | | | | | | | | | | | | | |
| Lunch in / out | | | | | | | | | | | | | | | |
| Dinner in / out | | | | | | | | | | | | | | | |
| Snack in / out | | | | | | | | | | | | | | | |
| Medication 1 | | | | | | | | | | | | | | | |
| Medication 2 | | | | | | | | | | | | | | | |
| Medication 3 | | | | | | | | | | | | | | | |
| Medication 4 | | | | | | | | | | | | | | | |
| Toilet | | | | | | | | | | | | | | | |
| Shower | | | | | | | | | | | | | | | |
| Aide's Visit | | | | | | | | | | | | | | | |
| Guest's Visit | | | | | | | | | | | | | | | |
| Away From Home Activity: | | | | | | | | | | | | | | | |
| Activity: | | | | | | | | | | | | | | | |
| Activity: | | | | | | | | | | | | | | | |

FIG. 9

METHOD, COMPUTER PROGRAM, AND SYSTEM FOR MONITORING A BEING

CROSS-REFERENCE TO RELATED APPLICATIONS

This is a continuation of U.S. patent application Ser. No. 15/484,853 filed Apr. 11, 2017, which is a non-provisional of U.S. provisional application Ser. No. 62/322,073 filed Apr. 13, 2016, incorporated by reference herein.

FIELD OF THE INVENTION

The present invention is related to monitoring of a person who lives alone without the use of any type of video images. (As used herein, references to the "present invention" or "invention" relate to exemplary embodiments and not necessarily to every embodiment encompassed by the appended claims.) More specifically, the present invention is related to monitoring of a person who lives alone without the use of any type of video images using motion sensors to determine when states are active and accelerometers to determine when activities occur within a state.

BACKGROUND OF THE INVENTION

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

Some individuals require the need of twenty-four hour a day monitoring for safety purposes. One way to provide this monitoring is with the presence of an aide or companion. However, the presence of an aide or companion twenty-four hours a day is not always available or desired. Automated monitoring systems that currently exist rely on visual images. For many individuals, the use of visual images is an unacceptable intrusion into their privacy. Other monitoring systems that do not use visual images are very simplistic in that they may monitor the individual to determine if the individual has fallen down, but provide little additional information regarding the activity of individual.

BRIEF SUMMARY OF THE INVENTION

The present invention pertains to a system for monitoring a person in a structure having a first room and a second room with a front door for egress and ingress to the structure. The system comprises a first motion sensor adapted to be disposed in the first room to determine a state associated with first room. The system comprises a first accelerometer adapted to be disposed in the first room to determine an activity in the first room. The system comprises a second accelerometer adapted to be disposed in the second room to determine an activity in the second room. The system comprises a second motion sensor adapted to be disposed in the second room to determine a state associated with the second room. The system comprises a door contact for identifying when the door is open. The system comprises a non-transient memory which receives signals from the first and second motion sensors, the first and second accelerometers, and the door contact. The system comprises a timer in communication with the memory which measures a time span associated with each signal from the first and second motion sensors and first and second accelerometers and the door contact when the first or second motion sensor detected motion and/or the first or second accelerometer detected activity and when those time periods occurred, and the door contact detected the door was open and when that time period occurred. The timer storing each time span and when each time period occurred in the memory. Each signal having an identifier identifying whether each signal arose from the first or second motion sensor and/or accelerometers or door contact. The identifier of each signal being stored in the memory. The system comprising a computer in communication with the memory. The computer taking a plurality of the signals and deriving cross state pattern signals from the plurality of signals and a pattern of the plurality of signals. The computer determines from each time span and when each time period occurred for the person and the cross state pattern signals whether the person is acting within an acceptable norm or outside the acceptable norm for the person. If the computer determines the person is acting outside the acceptable norm of the person, the computer produces an alarm signal. The computer not using any signals arising from a visual image sensor. Now equipment or component for signals received by the computer or the timer or the memory worn by the person. The system comprises an inactivity timer in communication with the memory which consolidates multiple contiguous signals into a signal.

The present invention pertains to a system for monitoring a person in a structure having a first room and a second room. The system comprises a first motion sensor adapted to be disposed in the first room to determine a state associated with first room. The system comprises a first accelerometer adapted to be disposed in the first room to determine an activity in the first room The system comprises a second accelerometer adapted to be disposed in the second room to determine an activity in the second room. The system comprises a second motion sensor adapted to be disposed in the second room to determine a state associated with the second room. The system comprises a non-transient memory which receives signals from the first and second motion sensors, and the first and second accelerometers. The system comprises a timer in communication with the memory which measures a time span associated with each signal from the first and second motion sensors and first and second accelerometers when the first or second motion sensor detected motion and/or the first or second accelerometer detected activity and when those time periods occurred. The timer storing each time span occurred in the memory. Each signal having an identifier identifying whether each signal arose from the first or second motion sensor and/or accelerometers. The identifier of each signal being stored in the memory. The system comprises a computer in communication with the memory. The computer taking a plurality of the signals and deriving cross state pattern signals from the plurality of signals and a pattern of the plurality of signals. The computer assigning from each time span and the cross state pattern signals a score to the person indicative of the person's level of activity and motion within a state from the signals. The computer not using any signals arising from a visual image sensor. No equipment or component for signals received by the computer or the timer or the memory worn by the person.

The present invention pertains to a system for monitoring a person in a structure having a first room and a second room. The system comprises a first motion sensor adapted to be disposed in the first room to determine a state associated with first room. The system comprises a first accelerometer adapted to be disposed in the first room to determine an activity in the first room. The system comprises a second accelerometer adapted to be disposed in the second room to determine an activity in the second room. The system comprises a second motion sensor adapted to be disposed in the second room to determine a state associated with the second room. The system comprises a non-transient memory which receives signals from the first and second motion sensors, and the first and second accelerometers. The system comprises a timer in communication with the memory which measures a time span associated with each signal from the first and second motion sensors and first and second accelerometers when the first or second motion sensor detected motion and/or the first or second accelerometer detected activity and when those time periods occurred. The timer storing each time span occurred in the memory. Each signal having an identifier identifying whether each signal arose from the first or second motion sensor and/or accelerometers. The identifier of each signal being stored in the memory; The system comprises a computer in communication with the memory. The computer taking a plurality of the signals and deriving cross state pattern signals from the plurality of signals and a pattern of the plurality of signals. The computer determining whether the person has fallen down in either the first room or the second room and cannot get up. The computer not using any signals arising from a visual image sensor. No equipment or component for signals received by the computer or the timer or the memory worn by the person.

The present invention pertains to a method for monitoring a patient. The method comprises the steps of measuring with a timer a time span associated with each signal from a first motion sensor disposed in a first room of a structure which determines a state associated with the first room when motion was detected in the first room. There is a second motion sensor disposed in a second room of the structure which determines a state associated with the second room when motion was detected in the second room. There is a first accelerometer disposed in the first room which determines an activity associated with the first room when the activity was detected in the first room. There is a second accelerometer disposed in the second room which determines an activity in the second room when the activity was detected. There is a door contact of a door for egress and ingress to the structure which determines a time period when the door was open. The timer storing each time span and when each time period occurred in a non-transient memory with which the timer is in communication. Each signal having an identifier identifying whether each signal arose from the first or second motion sensor or accelerometers or door contact. The identifier of each signal being stored in the memory. There is the step of deriving with a computer in communication with the memory from a plurality of the signals and a pattern of the plurality of signals cross state pattern signals. There is the step of determining with the computer from each time span and when each time period occurred for the person and the cross state pattern signals whether the person is acting within an acceptable norm or outside the acceptable norm for the person. If the computer determines the person is acting outside the acceptable norm of the person, the computer produces an alarm signal. The computer not using any signals arising from a visual sensor. No equipment or component for signals received by the computer or the timer or the memory worn by the person.

The present invention pertains to a computer program stored in a non-transient memory for monitoring a person. The program has the computer generated steps of reviewing states of a plurality of rooms and activities in the rooms from signals stored in memory. The states are obtained from motion sensors in the rooms and the activities of the rooms are obtained from accelerometers in the rooms. The motion sensors and the accelerometers generating the signals corresponding to the states and the activities. There is the step of matching a pattern to the states and the activities to create a derived state about the person without using any signals associated with visual images.

BRIEF DESCRIPTION OF THE SEVERAL VIEWS OF THE DRAWING

In the accompanying drawings, the preferred embodiment of the invention and preferred methods of practicing the invention are illustrated in which:

FIG. 9 is a schedule of activities.

DETAILED DESCRIPTION OF THE INVENTION

Figure 8:
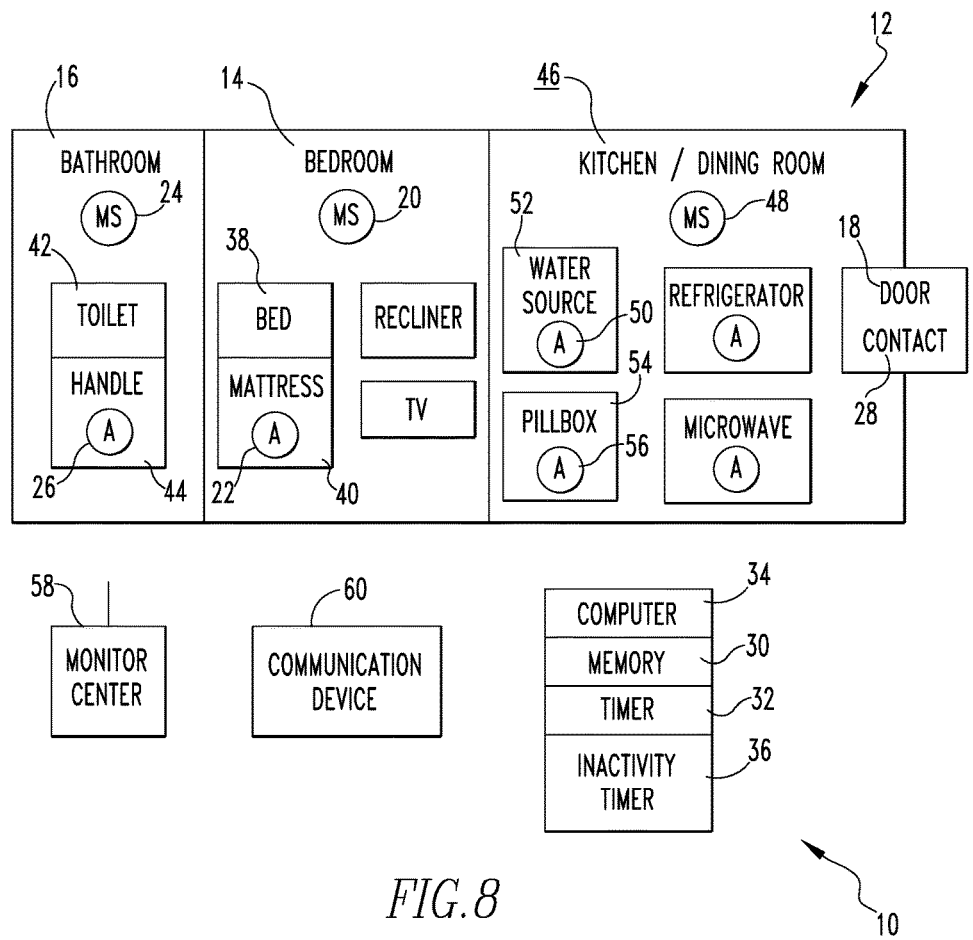
FIG. 8 shows a schematic representation of the system.

Referring now to the drawings wherein like reference numerals refer to similar or identical parts throughout the several views, and more specifically to FIG. 8 thereof, there is shown a system 10 for monitoring a person in a structure 12 having a first room 14 and a second room 16 with a front door 18 for egress and ingress to the structure 12. The system 10 comprises a first motion sensor 20 adapted to be disposed in the first room 14 to determine a state associated with first room 14. The system 10 comprises a first accelerometer 22 adapted to be disposed in the first room 14 to determine an activity in the first room 14. The system 10 comprises a second accelerometer 26 adapted to be disposed in the second room 16 to determine an activity in the second room 16. The system 10 comprises a second motion sensor 24 adapted to be disposed in the second room 16 to determine a state associated with the second room 16. The system 10 comprises a door 18 contact 28 for identifying when the door 18 is open. The system 10 comprises a non-transient memory 30 which receives signals from the first and second motion sensors 24, the first and second accelerometers 22, 26, and the door 18 contact 28. The system 10 comprises a timer 32 in communication with the memory 30 which measures a time span associated with each signal from the first and second motion sensors 20, 24 and first and second accelerometers 22, 26 and the door 18 contact 28 when the first or second motion sensor 20, 24 detected motion and/or the first or second accelerometer 22, 26 detected activity and when those time periods occurred, and the door 18 contact 28 detected the door 18 was open and when that time period occurred. The timer 32 storing each time span and when each time period occurred in the memory 30. Each signal having an identifier identifying whether each signal arose from the first or second motion sensor 20, 24 and/or accelerometers or door 18 contact 28. The identifier of each signal being stored in the memory 30. The system 10 comprising a computer 34 in communication with the memory 30. The computer 34 taking a plurality of the signals and deriving cross state pattern signals from the plurality of signals and a pattern of the plurality of signals. The computer 34 determines from each time span and when each time period occurred for the person and the cross state pattern signals whether the person is acting within an acceptable norm or outside the acceptable norm for the person. If the computer 34 determines the person is acting outside the acceptable norm of the person, the computer 34 produces an alarm signal. The computer 34 not using any signals arising from a visual image sensor. No equipment or component used in any way for signal production that is received by the computer 34 or the timer 32 or the memory 30 is worn by the person. The system 10 comprises an inactivity timer 36 in communication with the memory 30 which consolidates multiple contiguous signals into a signal.

The computer 34 may determine from the signals whether there is another person present in either the first room 14 or the second room 16 and the computer 34 takes into account whether there is the other person present when the computer 34 determines whether the person is acting within the acceptable norm or outside the acceptable norm. Each signal may have an identifier identifying the state or activity triggering the signal, and the state or activity identifier with each signal being stored in the memory 30.

The first room 14 may have a bed 38 with a mattress 40 and the first accelerometer 22 is adapted to be in contact with the mattress 40 to identify movement of the person on the bed 38. The second room 16 may have a toilet 42 and the second accelerometer 26 is adapted to be in contact with a handle 44 of the toilet 42 used to flush the toilet 42 to identify when the person flushes the toilet 42. The structure 12 may have a kitchen/dining area 46 with a third motion sensor 48 disposed in the kitchen/dining area 46 to determine a state of the dining area 46 and a third accelerometer 50 disposed at a water source 52 in the dining area 46 to identify when the person takes water from the water source 52.

The system 10 may include a pillbox 54 disposed in the structure 12 and a fourth accelerometer 56 adapted to be attached to the pillbox 54 to identify when the pillbox 54 is moved by person to take their medication. The computer 34 may assign a score to the person indicative of the person's level of activity and motion within a state from the signals. The system 10 may include a monitoring call center 58 remote from the structure 12 and the computer 34 sends the alarm signal to a monitoring call center 58. The system 10 may include a mobile communication device 60 remote from the structure 12. The computer 34 sends the alarm signal and the score to the mobile communication device 60.

The present invention pertains to a method for monitoring a patient. The method comprises the steps of measuring with a timer 32 a time span associated with each signal from a first motion sensor 20 disposed in a first room 14 of a structure 12 which determines a state associated with the first room 14 when motion was detected in the first room 14. There is a second motion sensor 24 disposed in a second room 16 of the structure 12 which determines a state associated with the second room 16 when motion was detected in the second room 16. There is a first accelerometer 22 disposed in the first room 14 which determines an activity associated with the first room 14 when the activity was detected in the first room 14. There is a second accelerometer 26 disposed in the second room 16 which determines an activity in the second room 16 when the activity was detected. There is a door contact 28 of a door 18 for egress and ingress to the structure 12 which determines a time period when the door 18 was open. The timer 32 storing each time span and when each time period occurred in a non-transient memory 30 with which the timer 32 is in communication. Each signal having an identifier identifying whether each signal arose from the first or second motion sensor 20, 24 or accelerometers or door contact 28. The identifier of each signal being stored in the memory 30. There is the step of deriving with a computer 34 in communication with the memory 30 from a plurality of the signals and a pattern of the plurality of signals cross state pattern signals. There is the step of determining with the computer 34 from each time span and when each time period occurred for the person and the cross state pattern signals whether the person is acting within an acceptable norm or outside the acceptable norm for the person. If the computer 34 determines the person is acting outside the acceptable norm of the person, the computer 34 producing an alarm signal. The computer 34 not using any signals arising from a visual sensor. No equipment or component for signals received by the computer 34 or the timer 32 or the memory 30 worn by the person.

The first room 14 may have a bed 38 with a mattress 40 and the first accelerometer 22 is in contact with the mattress 40. There may be the step of the first accelerometer 22 identifying movement of the person on the bed 38. The second room 16 may have a toilet 42 and the second accelerometer 26 is in contact with a handle 44 of the toilet 42 used to flush the toilet 42. There may be the step of the first accelerometer 22 identifying when the person flushes the toilet 42.

The structure 12 may have a kitchen/dining area 46 with a third motion sensor 48 disposed in the kitchen/dining area 46 which determines a state of the dining area 46 and a third accelerometer 50 disposed at a water source 52 in the dining area 46 which identifies when the person takes water from the water source 52. There may be the steps of the third motion sending a signal which indicates that the third motion sensor 48 has detected the person is moving in the kitchen/dining area 46, and the third accelerometer 50 sending a signal which indicates the third accelerometer 50 has detected the person is taking water from the water source 52.

There may be a pillbox 54 disposed in the structure 12 and a fourth accelerometer 56 attached to the pillbox 54 to identify when the pillbox 54 is moved by the person to take medication. There may be the step of the fourth accelerometer 56 sending a signal which indicates the fourth accelerometer 56 has detected the person has moved the pillbox 54. There may be the step of the computer 34 assigning a score to the person indicative of the person's level of activity and motion within a state from the signals.

The present invention pertains to a system 10 for monitoring a person in a structure 12 having a first room 14 and a second room 16. The system 10 comprises a first motion sensor 20 adapted to be disposed in the first room 14 to determine a state associated with first room 14. The system 10 comprises a first accelerometer 22 adapted to be disposed in the first room 14 to determine an activity in the first room 14. The system 10 comprises a second accelerometer 26 adapted to be disposed in the second room 16 to determine an activity in the second room 16. The system 10 comprises a second motion sensor 24 adapted to be disposed in the second room 16 to determine a state associated with the second room 16. The system 10 comprises a non-transient memory 30 which receives signals from the first and second motion sensors 20, 24, and the first and second accelerometers 22, 26. The system 10 comprises a timer 32 in communication with the memory 30 which measures a time span associated with each signal from the first and second motion sensors 20, 24 and first and second accelerometers 22, 26 when the first or second motion sensor 20, 24 detected motion and/or the first or second accelerometer 22, 26 detected activity and when those time periods occurred. The timer 32 storing each time span occurred in the memory 30. Each signal having an identifier identifying whether each signal arose from the first or second motion sensor 20, 24 and/or accelerometers. The identifier of each signal being stored in the memory 30. The system 10 comprises a computer 34 in communication with the memory 30. The computer 34 taking a plurality of the signals and deriving cross state pattern signals from the plurality of signals and a pattern of the plurality of signals. The computer 34 assigning from each time span and the cross state pattern signals a score to the person indicative of the person's level of activity and motion within a state from the signals. The computer 34 not using any signals arising from a visual image sensor. No equipment or component for signals received by the computer 34 or the timer 32 or the memory 30 worn by the person.

The present invention pertains to a system 10 for monitoring a person in a structure 12 having a first room 14 and a second room 16. The system 10 comprises a first motion sensor 20 adapted to be disposed in the first room 14 to determine a state associated with first room 14. The system 10 comprises a first accelerometer 22 adapted to be disposed in the first room 14 to determine an activity in the first room 14. The system 10 comprises a second accelerometer 26 adapted to be disposed in the second room 16 to determine an activity in the second room 16. The system 10 comprises a second motion sensor 24 adapted to be disposed in the second room 16 to determine a state associated with the second room 16. The system 10 comprises a non-transient memory 30 which receives signals from the first and second motion sensors 20, 24, and the first and second accelerometers 22, 26. The system 10 comprises a timer 32 in communication with the memory 30 which measures a time span associated with each signal from the first and second motion sensors 20, 24 and first and second accelerometers 22, 26 when the first or second motion sensor 20, 24 detected motion and/or the first or second accelerometer 22, 26 detected activity and when those time periods occurred. The timer 32 storing each time span occurred in the memory 30. Each signal having an identifier identifying whether each signal arose from the first or second motion sensor 20, 24 and/or accelerometers. The identifier of each signal being stored in the memory 30. The system 10 comprises a computer 34 in communication with the memory 30. The computer 34 taking a plurality of the signals and deriving cross state pattern signals from the plurality of signals and a pattern of the plurality of signals. The computer 34 determining whether the person has fallen down in either the first room 14 or the second room 16 and cannot get up. The computer 34 not using any signals arising from a visual image sensor. No equipment or component for signals received by the computer 34 or the timer 32 or the memory 30 worn by the person.

The present invention pertains to a computer program stored in a non-transient memory for monitoring a person. The program has the computer generated steps of reviewing states of a plurality of rooms and activities in the rooms from signals stored in memory. The states are obtained from motion sensors in the rooms and the activities of the rooms are obtained from accelerometers in the rooms. The motion sensors and the accelerometers generating the signals corresponding to the states and the activities. There is the step of matching a pattern to the states and the activities to create a derived state about the person without using any signals associated with visual images.

Figure 7:
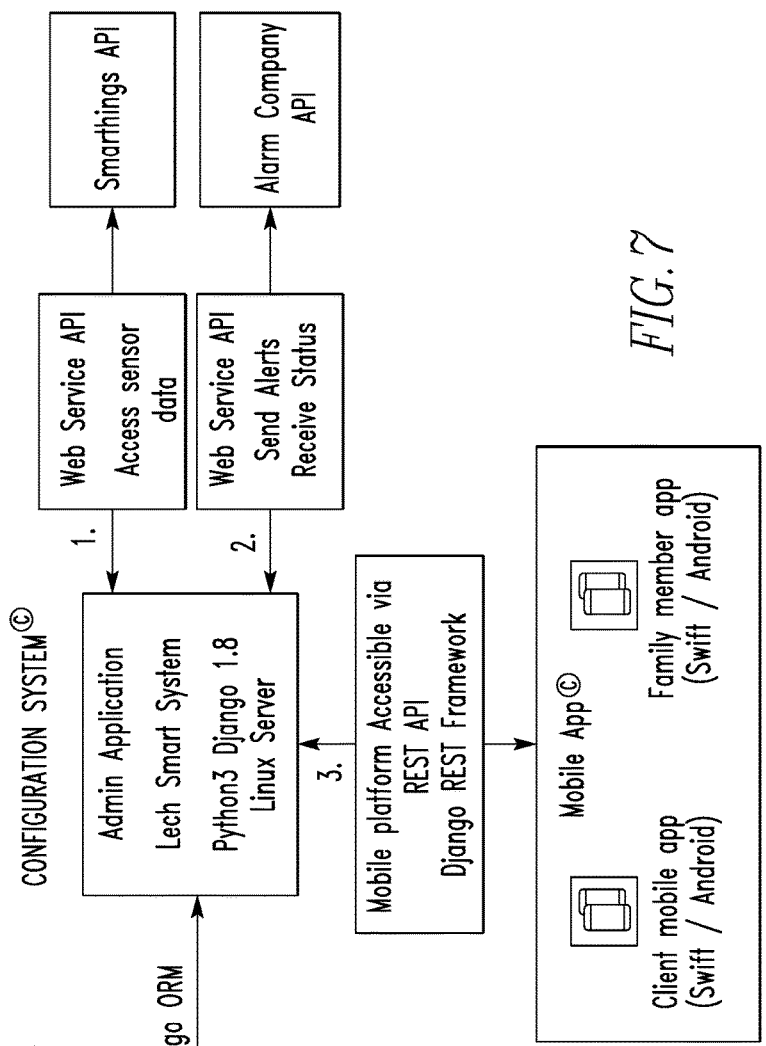
FIG. 7 shows the architectural design chart of the system of the present invention.

In the operation of the invention, the system 10 is used to monitor the activity and general health of the Aging-In-Place (the 'Home') independently living (alone) client (the 'Client'), alerting by email, telephone call, or text the 24/7 independent monitoring service, parent, child, doctor, friend, neighbor, or other (the 'Care-givers') the well-being of, or emergency events affecting the client. Through the installation, use and reporting of motion sensors and accelerometers ('Accelerometer sensors') to a central gateway and then to the cloud-based operating and data storage system 10 (comprising the Client Configuration System, Mobile App, Monitoring and Alert System, and Data Accumulation System, to be described below, and as shown in FIG. 7). Currently, up to 8 States (the 'State') in which activity occurs are monitored: In Bathroom, With Visitors, In Dining/Kitchen Area, In Motion, In Bed/Bedroom, Away from Home, In Recliner/Living room, and Taking Medication/Hydration. Within these 8 states, monitoring of a variety of activities is routinely done: drinking, using refrigerator, oven, microwave, toilet 42 use, shower use, sleeping, TV watching, and pill intake.

Motion sensors are used to identify movement in regard to a state, and thus whether the state is active. For instance, a motion sensor can be positioned on a wall in a bedroom or on a wall in the kitchen/dining room to detect when there is movement in the bedroom, and thus the bedroom state is active, or two detect when there is movement in the kitchen/dining room, and thus the kitchen/dining room state is active, respectively. Accelerometers are used to identify a specific activity within a state. For instance, and accelerometer can be attached to a TV remote control to identify when the remote control is picked up by the Client. An accelerometer can be attached to a cold water handle of the shower to identify when the cold water handle is moved for the Client to take a shower. An accelerometer disposed in a recliner can be used to identify a resting or leisure activity. For a given activity, the accelerometer is attached to an object associated with the activity to identify when the object is moved, and thus the activity has occurred. Each motion sensor and each accelerometer has its own transmitter to transmit its signal. An example of a motion sensor with a transmitter that can be used is model number IR(P)-9ZBSSL PIR, and an example of an accelerometer with a transmitter that can be used is model number CGMS-1ZBS, both sold by Climax Technologies Co., LTD of Taiwan, and which use ZigBee communication technology By uploading to the Configuration system, each Clients' particular, but normal, living patterns, from which specific Patterns (the 'Patterns') are set for each client (as described in terms of frequency or time), and automatically updates the system 10 throughout the day. If or when these Patterns are exceeded or not met over a continuous period of time or frequency, as pre-determined by and/or in conjunction with Care-givers and client, the system 10 assigns a score (the 'Score') of 1-10 1 is the lowest, indicating an emergency event, and 10, indicating very normal). Based on the Score assigned, serves as an indication of 'all is well' or the opposite, an early warning to failing health and/or an emergency event. This information may preclude more dire consequences, i.e.: unnecessary visits to hospitals and nursing homes, and other more serious health deteriorations. The installed sensors communicate through a Gateway located in the Home, which communicates with cloud-based system 10 via Wi-Fi, cable (through a router) or possibly, RFID. Caregivers of Client (and the Client themselves, if they so choose) are alerted to their State through Mobile App, and/or to a home based computer 34.

Components of the System 10

1. Configuration System 10 gives the Client or Care-giver the place to enter all Cliental information and to define their Patterns (as defined by amount of frequency or time). Entering information with the use of these forms establishes a base line. As the client is monitored over time, and data is collected from the various sensors throughout the living area, the structure 12, the routines or actual patterns over time of the client are refined to establish a norm of behavior or routine of the client. An acceptable, albeit small deviation from the norm for a given time period, such as a day or three days or a week, are considered acceptable, but if data is received at any given time, that is outside the norm at that time, an alarm is sounded. This way, a slow but consistent change in the pattern of the client's routine is recognized and accepted to the norm, so a false alarm or alert is not triggered. For instance, a client may slowly start going to bed later and later, as is the client's prerogative, without this change in sleeping behavior necessarily being a cause for alarm. It has the sleeping behavior change occurs; the sleeping change will be brought to the attention of the Caregiver through the reports described below, for the Caregiver to consider as appropriate. However, as long as this change in sleeping behavior is small, and alarm or an alert is not triggered, although the score regarding the Client's health and well-being may change. Alternatively, if it is so desired, the information provided in the completed forms below can establish the norm which is not permitted to be changed by the actual data acquired over time of the client's patterns, or be changed only by direct authorization by the Caregiver from the actual patterns determined from the acquired data over time of the Client. This consists of the following data:

| Pages | Tables Updated | Actions |
| --- | --- | --- |
| Login | | |
| Forgot Password | Email Form | |
| | Password Reset Form | |
| Configure New Profile | Clients | listing, view, add, edit, delete |
| | Phone numbers | listing, view, add, edit, delete |
| | Email Address | listing, view, add, edit, delete |
| Configure Home Location | Client locations | listing, view, add, edit, delete |
| Configure Caregivers | Client location caregivers | listing, view, add, edit, delete |
| | Phone numbers | listing, view, add, edit, delete |
| | Email Address | listing, view, add, edit, delete |
| Configure Network | N/A (should we add API Key of Hob to Client_location?) | |
| Configure Sensors | Sensors | listing, view, add, edit, delete |
| Configure Patterns | State Patterns | listing, view, add, edit, delete |
| Configure Event Profile | Event Profiles | listing, view, add, edit, delete |
| | Schedule | |

[0036] Example of Client information requested is as follows:

System and Services Information and Order Form

Customer's Name_____DOB_____

Service Address: _____

Primary Telephone/Text #____         Email

Billing Address

Secondary Telephone/Text #       Email

Caregiver, Health Care Provider/Manager Contact Information:

1. Primary Caregiver Name/Address         Relationship

Telephone/Text #         Email

2. Secondary Caregiver Name/Address         Relationship

Telephone/Text #         Email

3. Primary Physician's Name/Address

Telephone #         Emergency #

Text #         Email

4. Health Management Manager Name/Address

Company Name

Telephone #            Emergency #

Text #            Email

5. Emergency Contact Name/Address

Telephone #            Secondary #

Text #            Email

Date Service Begins    Date Service Terminated

Health Management Company: _____

_____

Household composition

Residence:   ☐ House #Rooms____   ☐ Apartment/Room   #Rooms_____

☐ Lives alone     ☐ Independently            ☐ Assisted Living Facility
                  ☐ With spouse or sig. other ☐ other family member Marital status   ☐  single ☐ divorced   ☐ widowed   ☐ married   _____

<u>IMPORTANT</u> The following are to be discussed with the customer and/or caregiver prior to provision of monitoring services:

- Services provided
- Charges for services
- Customer Service procedure
- Privacy notice Communications and Hook-up Available for BeThere24 Gateway Router   Carrier_____ IP Address or S/N _____

Wi-Fi   Carrier_____   Name _____
Password_____

IP Address_____   Web Page _____

None

Order Form

Monitoring Systems Available    Use/Benefits

Entry/Exit Door    monitors the opening and closing of entrance doors.  Be alerted to any unexpected entry or exit.  Qty. _____

Motion Sensors    Monitors movement within rooms.  An abrupt cessation of activity may indicate a problem.

List of Rooms:

Bedroom Qty___    Bathroom Qty ___

Living Room Qty.____    Kitchen Qty. _____

Other Qty___ ;   Describe  _____

Favorite Chair(s)    Monitors use and extent of sitting time.  Too much inactivity may be a sign of a problem. Qty.____

| | |
|---|---|
| Bed(s) | Monitors use, extent, and quality of sleep/nap time. Too much sleep/nap time may be a sign of a problem. Qty.____ |
| Toilet(s) | Monitors frequency and length of use of toilet(s). Too many (or few) times or for too long a period of time spent on the toilet may be a sign of a problem. Qty.____ |
| Water Flow | Water continually running (in a sink or shower) may be an indication of something more problematic than just forgetting to turn off the water. |
| Pill Dispenser | Monitors frequency and times of day medication is taken on a daily basis. Missed medication is a serious matter, and reminders are usually helpful. Qty.____ |
| Appliances | Monitors frequency and times of day appliances are used. Examples are: Water Coolers, Micro wave, and Refrigerator. This information may be helpful to determine levels of hydration and general dietary intake. Qty.____ |

Monitoring Services Available

24/7 Outside Monitoring (Fee Based)

Family/Friends or Internal Health Management Monitoring Only

Installation

Professional installer (Fee based)

Do It Yourself

Client's Normal Schedule of Daily Activities FIG. 9 is a blank form of normal living activities to be filled in. This form should be filled in by a combination of efforts of the Client, Caregivers, and professionals who may be responsible for the well-being of the client. Be as detailed and specific as possible.

Caregiver's Alert Issuance Instructions (If activities being monitored extend above or below a specific duration or frequency, a problem may be the cause. Two types of alerts can be issued: A RED alert, the highest alert with the greatest urgency, is where the greatest deviation from normal activity has occurred, and professional 24/7 monitoring (fee based service) is alerted (together with the caregiver, Health Care Management and client) as the event occurs. A RED alert may result in Emergency Services being called to the residence. A YELLOW alert, a non-urgent alert, is where a small deviation from a normal activity has occurred, and only a caregiver, Health Care Management and the client are notified with a once a day alert (except for issues involving medication). The monitoring center 58 will follow a prescribed protocol of action for a given alarm or alert. The monitoring center 58 uses a list of codes to instruct their operators as to what action must be taken. The alarm or alert may come through as a email. text, or some direct communication between the computer and the monitoring station. Care should be taken in designating the quantity or length of time of unacceptable deviations for each of the following activities, too low a tolerance for deviations may result in a greater number of false positive alerts.

| Activity | Situation | # Deviations to Yellow Alert | # Deviations to Red Alert |
|---|---|---|---|
| Sleep | In Bed too late | | |
| | Slept too late | | |
| | Slept too long | | |
| | Slept too little | | |
| Nap | Napped too long | | |
| | Napped too frequently | | |
| | Napped too infrequently | | |
| Meals | Ate for too long | | |
| | Ate too infrequently | | |
| Medications | Off meds schedule | | |
| | Missed Medications | | |
| Bathroom | | | |
| Toilet | Duration | | |
| | Frequency | | |
| Shower | Duration | | |
| Out of Home | Out too long | | |
| | Did not go out | | |
| Inactivity | Duration | | |

2. Mobile App

The System's Mobile App is uploaded from one of the many App Stores (i.e. Google Play Store, ITunes Store, Apple Store, etc) found on the Internet. The App is intended to provide the Client and Care-giver, and others, the ability to see from a single screen the condition (normal or otherwise) of the Client.

Figure 1:
FIG. 1 shows the mobile app health summary screen.

FIG. 1 Mobil App 'Health Summary' Screen Depicts a dial design around which all the States of monitored activity, with the 'Score' for the Client in the specific State, pointed to at the center of the dial. Above the actual dial is the day or date of the specific State being pointed to. To the right and left of the State name are arrows permitting user to toggle between other 24 hour periods of time, going back in time, or forward in time. Below the dial, the name of the specific State that is referenced. Below the referenced State is a short description of the amount of time or frequency the Client has been in that State, with a note stating whether it is within normal Pattern for that Client. Below this are two icons allowing the viewer to go to the 'Health Detail' screen (left-hand icon) or the 'Health Graph' screen (right-hand icon). In the upper right-hand corner is a small 'Alert' icon, and if a red bullet is shown, identifies a cautionary or emergency situation has occurred. Upper left-hand corner is an icon for a 'pull down' window, allowing viewer to navigate to other screens within the Mobile App.

Figure 2:
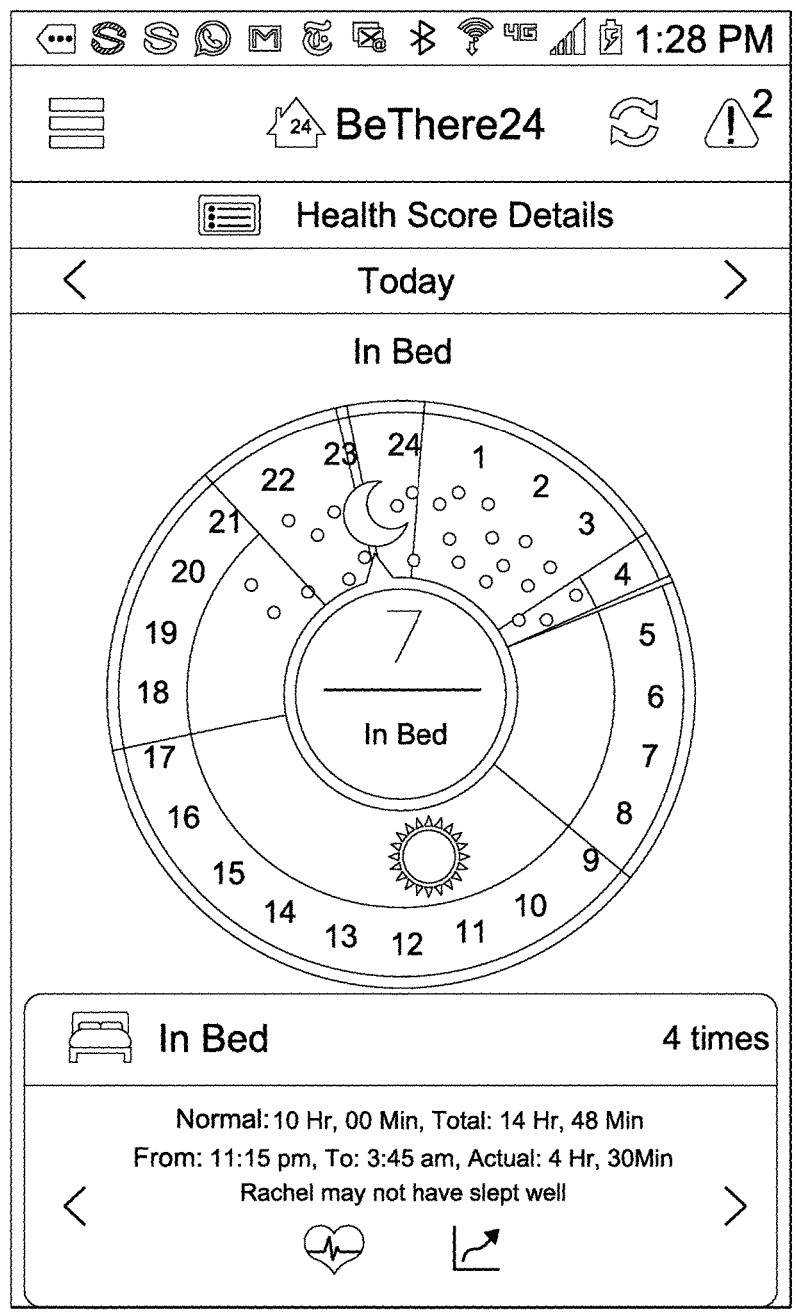
FIG. 2 shows the mobile app health detail screen.

FIG. 2 Mobil App 'Health Detail' Screen Depicts a 24 hour dial following the 24 hours of the current day. This screen is specific for each of the States and shows the detail of the Pattern (as lightly shaded areas beginning in the center of the dial and projecting out to the outer circle of the dial, as the hands of a clock) that the Client has been in that specific State. The viewer is able at a glance to see the previous twenty four hours of Pattern in the specific State, and at a glance, be able to understand better the Pattern of that State for the client. At top of this screen is the day or date of the specific State. To the right and left of the State screen are arrows allowing viewer to toggle between other 24 hour periods of time, going back or forward in time. At the bottom of this screen, is the name of the specific State pointed to. Below the State is a short description of the amount of Pattern the Client has been in that specific State, and a note as that being within a normal Pattern or not. A pop-up screen of all States can be brought up by clicking on the screen's State name, and from there once the pop-up of all the States comes up, one can choose from either of the other States and go directly to the Health Scores Detail screen of that particular State (see FIG. 6 in Addendum 2). Below this short description/note are two icons allowing the viewer to go to the 'Health Summary' screen (left-hand icon) or the 'Health Graph' screen (right-hand icon). In the upper right-hand corner is a small 'Alert' icon, and if a red bullet is shown, identifies a cautionary or emergency situation. Upper left-hand corner is an icon for a 'pull down' window, allowing viewer to navigate to other screens within the Mobile App.

Figure 3:
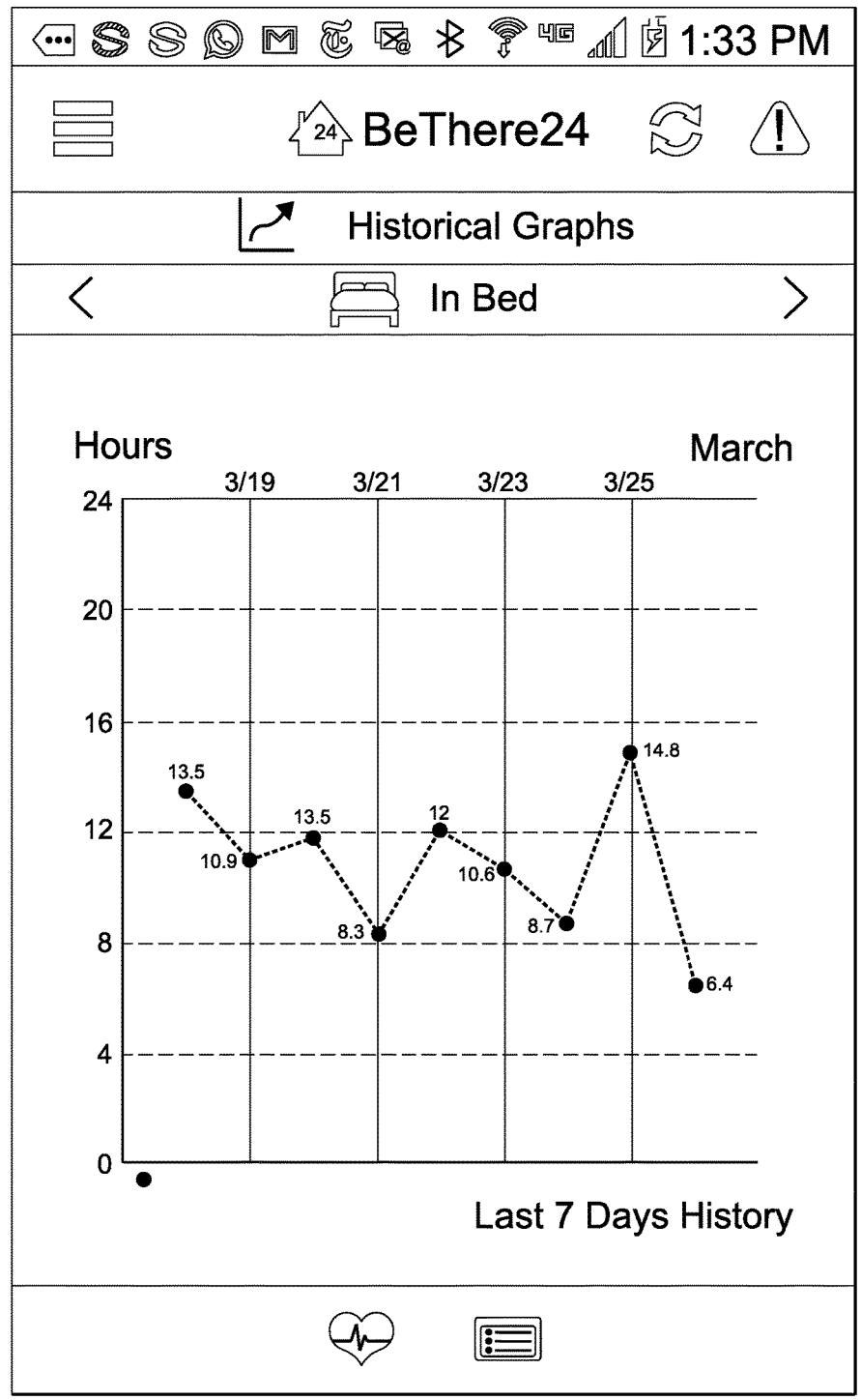
FIG. 3 shows the mobile app health graph screen.

FIG. 3 Mobil App 'Health Graph' Screen Depicts a line graph following the last 7 days of monitored activity of a specific State. This screen is State specific and shows the Pattern (each day a point on the graph) State. The viewer is able at a glance to see the previous 7 days of the Client's Pattern in each State. The viewer can toggle between last 7 days or last 30 days. At the top of the screen is the name of the specific State being rendered. At the bottom of the screen are three icons allowing the viewer to go to the 'Health Summary' screen (left-hand icon), the 'Health Detail' screen (middle icon) or the 'Alert' screen (right-hand icon). In the upper right-hand corner is a small 'Alert' icon, and if a red bullet is shown, identifies a cautionary or emergency situation. Upper left-hand corner is an icon for a 'pull down' window, allowing viewer to navigate to other screens within the Mobile App.

Figure 4:
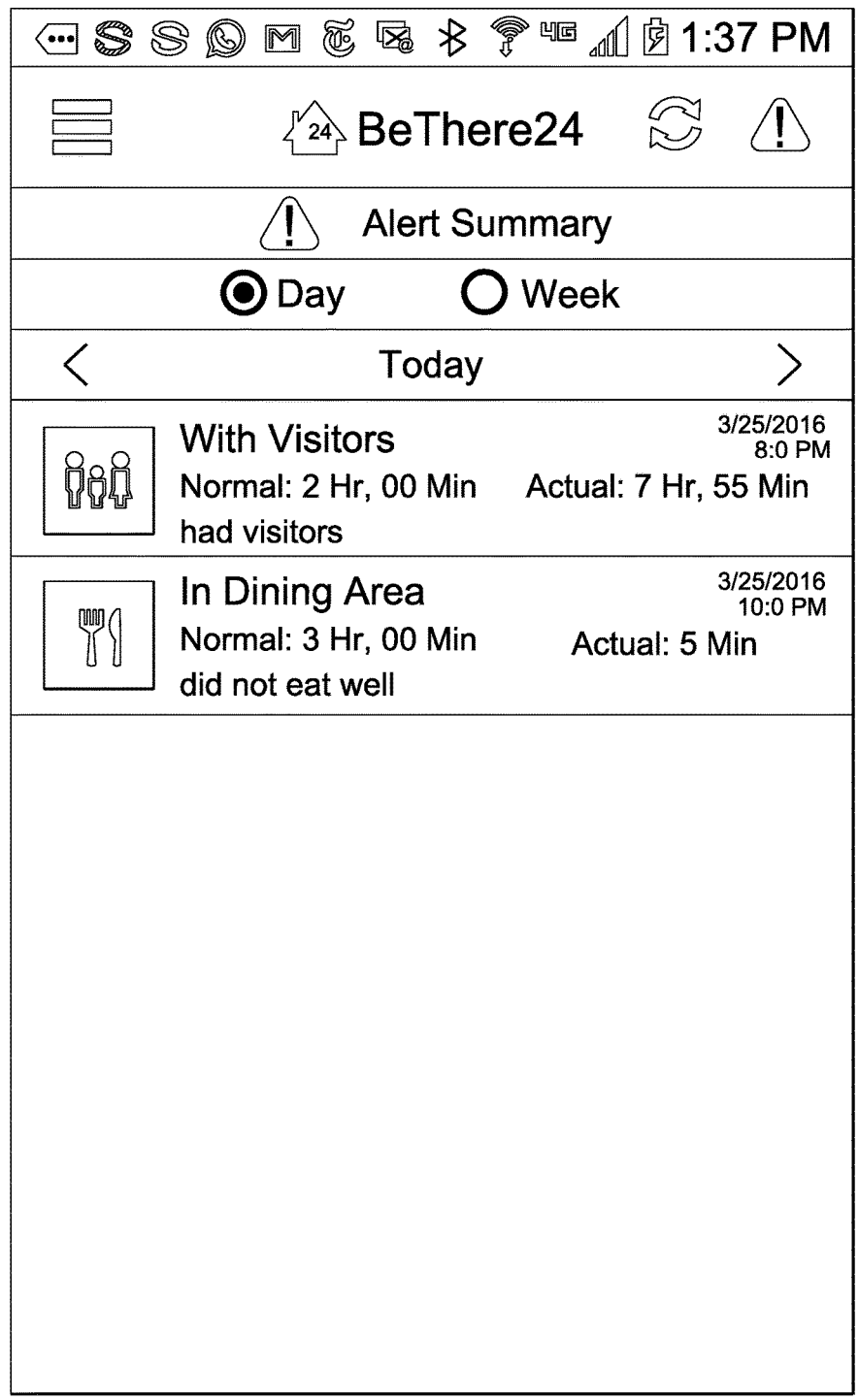
FIGS. 4 and 5 show the mobile app alert screen.
Figure 5:

FIGS. 4-5 Mobil App 'Alert' Screen

Lists the alerts, or State of Client's Pattern that were exceeded, or not reached Pattern, by date time, and the amount of the excess or recess from the Pattern as initially configured by the Client. At top of this screen is the day or date of the specific State. To the right and left of the screen are arrows allowing viewer to toggle between other 24 hour periods of time, going back or forward in time. At the bottom of this screen, is the name of the specific State pointed to.

Below the State is a short description of the amount of Pattern the Client has been in that specific State, and a note as that being within a normal Pattern or not. Below this short description/note are two icons allowing the viewer to go to the 'Health Summary' screen (left-hand icon) or the 'Health Graph' screen (right-hand icon). In the upper right-hand corner is a small 'Alert' icon, and if a red bullet is shown, identifies a cautionary or emergency situation. Upper left-hand corner is an icon for a 'pull down' window, allowing viewer to navigate to other screens within the Mobile App.
State 3. Monitoring and Alert System The system's Monitoring and Alert System© is used to store Client's Patterns within the State's Pattern. If those Patterns are exceeded or not met, an alert is issued system wide, and the Client and Care-givers, so designated, are notified.

4. Data Accumulation System

The cloud based memory 30 that store signals of each of the system's motion sensors and accelerometers. A start time and end time measure the time period during which motion was detected by the sensor. An inactivity timer 36 is used to consolidate multiple contiguous signals into one signal in order to avoid too much data. That is, the signals produced between the start and the end of the state or activity are redundant, so they can be eliminated without loss of indicative information. For instance, all the signals from a motion sensor in a room from the time a Client starts moving in a room until the time the Client stops moving in a room are redundant, simply repeating the movement sensed of the Client in the room.

The cloud based memory 30 can also be used to store information about a door contact, measuring the start and end time for an open contact. The 'Client_location_id' is included so a proper query index can be created for Client location and end_time, to find the signals for all sensors for a Client at a particular location within a specified time range.

How the Pattern of the Client is Measured:

The System's 'Simple Signal Machines©' Definitions/Assumptions:

This set of specifications will only detail storing signals from Accelerometer Sensors.

Accelerometers pass values of 0 (no motion) and 1 (in motion) at intervals of 1 second.

Because Accelerometers issue signals every second, the Signal table will "collapse" the sensor data into meaningful segments only—each beginning with an "on" value and ending with an "off" value or a derivative thereof.

A Timer that is set or reset for a configurable amount of time when an "on" value (1) is received. An "Off" signal received while the Timer is running will only be processed if and when the Timer expires.

Storing a Signal row in the Signal table is accomplished as follows:
sensor_id
Client_location_id
start_time=time (from memory)
end_time=time (from "off" sensor whose timer expired)

The System's Sensor Rules©:

Accelerometer Sensor/Accelerometer (Ace) Rules:

1. If an Accelerometer sensor sends an On signal, then set (if not already running) or reset (if already running) a Timer associated with that Sensor for a configured amount of time.
2. If an Accelerometer sensor sends an Off signal AND the associated Timer expires, then Store a Signal Row.

Motion Detector (MD) Rules:

1. If a Motion Detector sensor sends an On signal, then set (if not already running) or reset (if already running) a Timer associated with that Sensor for a configured amount of time.
2. If a Motion Detector sensor sends an Off signal AND the associated Timer expires, then Store a Signal Row.

The System's 'State Machine©'

Purpose: This document will specify when and how to open and close States based on Signal Rows stored from Accelerometer, Motion Detector, and Door Contact sensors.

Definitions/Assumptions:

Within this set specifications, Signal Rows will be stored in the database. States will typically be opened on closed based on analyzing the contiguous chronological Signals and determining patterns depending on whether they come from the same sensor or different ones. Signal Rows will be indexed by start_time in order to guarantee their retrieval in chronological sequence. When considering 2 chronological rows, the first will be considered the Current Row and the second will be considered the Next Row. Not every pair of Rows will create a State—some rows will be "discarded" and the next chronological row will be considered the new Next Row.

In Motion is defined as any time the individual is not in their bed or recliner, provided they are not Having Guests. Time spent Away from Home will be considered as In Motion.

There may be more than one Open State at any given time.

Timers are set based on the individual Sensor if it has a value, or the Sensor Type if the Sensor Inactivity Timer is zero or null.

Mutually exclusive States are those that cannot occur at the same time unless more than 1 Client is in the home. Typically, these would be the In Bed, In Bathroom or In Dining Area State Types, and they will be flagged with as Exclusive.

Opening a State means inserting a row into memory as follows:
start_time=start_time from the first SIgnal Row when the State is opened
Client_location_id=Client_location_id of the Sensor
State_stype_id=State_type_id of the Sensor
sensor_id=sensor id of the Sensor Updating an Open State means changing the memory values as follows:
end_time=end_time from the Current Signal Row Closing a State means inserting a row in the State table as follows:
start_time=start time (from memory)
end_time=end time (from memory)
Client_location_id=Client_location_id (from memory)
State_stype_id=State_type_id (from memory)
sensor_id=sensor_id (from memory)
score=TBD by the Scoring Machine When opening or updating a State, if the Sensor or Sensor Type has an Inactivity Timer associated with it, then the State Type Timer End Time is calculated as Signal End Time+Inactivity Timer Value associated with the Sensor (if present) or the Sensor Type Note: The concept of "conflicting" sensors is introduced. A column will be added to the data model in order to support this feature. Within this document the new field will be referred to as the "Exclusive indicator". Each sensor can either be designated as "Exclusive" (such as a Bed or Bathroom) or non-Exclusive (such as a Pillbox). The basic rule is that if more than one signal from an "Exclusive" sensor of the same sensor type (e.g. Motion Detector or Accelerometer) is received, then someone else must be in the home or structure 12. Mutually Exclusive States may exist once a Door is opened (during the Inactivity Timer period) in order to detect guests.

Universal Rules (Applies to ALL State Types):
1. If there are no Open States, then Open a State based on the Signal Row State Type associated with the Sensor.
2. If the Signal Row has the same State Type as any Open State then Update that Open State (with the end time of the Signal Row).

Mutually Exclusive Sensor Type Rules:
3. If the Next Signal Row has a different State Type as the Open State AND the Open State Type is NOT exclusive, then open a State.
4. If the Signal Row has a different State Type than any Open State AND the Signal Row Sensor Type is Exclusive AND the start time of the Signal Row is less than the end time of a Door Open State, then Open a State.
5. If the Signal Row has a different State Type than ANY Open State AND the Signal Row Sensor Type is Exclusive AND the Door Timer is NOT running, then Close ALL Open States, and Open a State.

Taking Medications (Meds) Rules:
6. If the Signal Row is associated with a Meds State and there already is a Meds Open State AND the Signal Start Time is less than the Meds Timer End Time, then Update the Open State and recalculate the Meds Timer End Time.
7. If there is a Meds Open State and ANY Signal Start Time is greater than the Meds Timer End Time, then close the Taking Medications State.

Door Sensor Type Rules:
8. If the Signal Row Sensor is associated with a Door Sensor Type AND no Door Ajar Open State exists, then open a Door Ajar State and calculate Door Timer End Time.
9. If the Signal Row is associated with a Door State and there already is a Door Open State AND the Signal Start Time is less than the Door Timer End Time, then Update the Open State and recalculate the Door Timer End Time.
10. If there is a Door Open State and ANY Signal Start Time is greater than the Door Timer End Time, then close the Door Ajar State.

Having Guest (HG) Rules:
11. When closing a Door Ajar State, if there is more than 1 "Exclusive" States with overlapping times during the duration of a Door Ajar State, AND there is NO Having Guests Open State, then open "Having Guests" State.
12. When closing a Door Ajar State, if there are NO overlapping Exclusive States during the duration of the Door Ajar State AND there is a Having Guests Open State, then close "Having Guests" State.

Away from Home (AFH) Rules:
13. When closing a Door Ajar State, if no other sensors are triggered "on" during the duration of the Door Ajar State, AND there is no current Away from Home Open State, then open an "Away from Home" State at the start time of the Door Ajar State.
14. When closing a Door Ajar State, if ANY sensor triggers an "on" signal during the duration of the Door Ajar State, AND there is a current Away from Home Open State, then close the "Away from Home" State at the start time of the Door Ajar State.

In Motion (IM) Rules:
15. If no In Motion State is open AND there is no open State for "In Bed", "In Recliner" or "Having Guests", then open an "In Motion" State.
16. If an In Motion State is open AND an "In Bed", "In Recliner", or "Having Guests" State is opened, then close "In Motion" State.

Health Aide Presence or Caregiver visiting (HAP) Rules:
17. When closing a Door Ajar State, if there is more than 1 "Exclusive" States with overlapping times during the duration of a Door Ajar State, AND there is NO Having Guests Open State, and Health Aide Presence sensor is triggered, then open "Health Aide Presence" State.

When closing a Door Ajar State, if there are NO overlapping Exclusive States during the duration of the Door Ajar State AND there is a Health Aide Presence Open State, then close "Health Aide Presence" State.

During time in which Health Aide Presence sensor is trigger, motion sensors will trigger a code indicating the presence of the Health Aide Presence, and report said activity in tandem with the data reported on the client. The data is still collected, as is the case for normal operation from the various sensors in the structure 12, but during the entire time the Health Aide Presence state is on, all data collected during this entire time is saved in memory but not applied to the patterns of the Client, so the patterns are not skewed or changed in any way do to the presence of the aide or guest. Instead, an average for each sensor in the structure 12 for a predetermined time period shortly before the aide or guest arrives is applied for the entire time period the guest or aide is present, so the patterns of the Client will be complete and will reflect the behavior of the Client and not of others. The assumption is that when there is an aide or guest present, if there is any type of emergency, the eight or guest with the Client will summon help. The average time period for a given sensor can be established in the computer 34 previously so that when the guest or aide is present with the Client, and the Health Aide Presence state exists and is initially triggered, the computer 34 takes the data from each sensor for the previously determined time period inputted into the computer 34, for instance, three hours or six hours, and establishes an average. This average is then applied to that sensor for the entire time period the Health Aide Presence exists. Alternatively, it can be established that the computer 34 forms an average for each sensor for a given time period at a given time, in this precalculated average is then available to be applied as needed. For instance, at midnight each night, the computer 34 calculates the average for each sensor for data received between 6 AM and noon, and between noon and 6 PM, and between 6 PM and midnight for that day. When the Health Aide Presence state is triggered, the time that it is triggered is identified, and the average from the previous day covering the time the state is triggered is then used. Of course, any time may be chosen as determined Cross-State Pattern Matching Some States cannot be determined by the signals from a single sensor, but rather require an analysis of multiple sensors combined. Cross-State Pattern Matching builds off of the existing State Pattern Matching by extending the patterns to include multiple, correlated States. One example of such a pattern is Away From Home, which correlates the signals from the door connector and motion sensors.

These States are 'derived' States and are indicated as such in the database. Derived means they are determined by a combination of States, matched by a pattern.

Background Processing

A background process is responsible for checking for possible cross-State matches by periodically scanning the States per client within the span of one virtual day (starting and ending in their configured virtual start of day. This process is called Pattern Scanner. It builds a linear time-line of all the States recorded during this time span. This linear time-line is then used to find correlations/patterns.

Away from Home Pattern

A pattern of States indicating motion in the home followed by the front door opening (and not necessarily closing), followed by a period of no motion States will create an 'Away From Home' State with a start time being the time of the door 18 opening. The end State will continue to extend as long as there is no motion in the home. The final end of this State is identified when the door 18 opens and closes while in this State, followed by States indicating motion in the home. The duration is the difference between the start and end times of the Away From Home State. Patterns on this State can trigger alerts if the client is away for too long, or if the period is outside an expected time period, even for a short duration.

With Visitors Pattern

A pattern of the front door 18 opening and closing, preceded by motion in the home and followed by motion simultaneously in different non-overlapping areas of the house will create a With Visitors Pattern. The end of this State is identified when the door 18 opens and closes while in this State, followed by States indicating continued motion in the home, but occurring in only one area at a time or no motion at all.

In Motion Pattern

A pattern of States indicating one Client is moving from room to room. The States do not overlap, indicating that only one Client is moving. The end of the State is determined by there being a lapse in time from motion in any of the States used to form the pattern.

Fall in Home Pattern

A pattern of States indicating motion in the home followed by a period of no motion, when both 'In Bed' or 'In Recliner' States have not triggered will create an 'Fall in Home' State with a start time being the time of no motion and no In Bed or In Recliner States triggered. The end State will continue to extend as long as there is no motion in the home and no In Bed or In Recliner State trigger. The final end of this State is identified when motion in the home resumes. The duration is the difference between the start and end times of the Fall in Home State. Patterns on this State can trigger alerts if the client fallen and does not get up.

From each of the patterns, such as those described above, that are formed over time from the signals from the motion sensors and accelerometers, a norm is established, and a score can be determined. Any deviation from the norm is the basis for an alert or an alarm. The same holds true for any derived states.

Implementation Design

The linear time-line is created as follows:

Extract all States from the beginning of the virtual start of day to the end of that day and create separate 'swim-lanes' for each State, or in other words create a separate list for each State, which contains each of the States' time segments.

Create a consolidated time-line which contains the following types of segments:

An overlapping segment, which has a start and end time and a list of the overlapping State segments from the other swim-lanes that overlap with each other for that time segment.

A non-overlapping segment, which has a start and end time and a reference to the swim-lane that contains one or more contiguous non-overlapping States.

A marker segment for the door opening and closing.

Note that some States may overlap by a small amount, which only identifies a transition from one State to another. There will need to be an adjustment for this situation by defining the minimum amount of time to overlap to be considered an overlapping segment.

Scenarios

The linear time-line is used as follows for each of the above manufactured States:

1. Away from Home—Scan from the beginning of the time-line until a door open/close marker. If any motion segments are found prior to the door marker and then no motion segments right after the marker, create the Away from Home State if not already created. If already created, extend the end time for this State. If another door open/close marker is found while in this State, and a motion segment is found after this marker, end the State and it will no longer be extended.

2. With Visitors—This is similar to Away from Home, but motion segments are preceding and immediately following the door open/close marker and these motion segments contain some overlapping segments.

3. In Motion—There are multiple contiguous motion segments with small overlapping segments, indicating one Client is moving from room to room. This State is ended when the movement is largely confined to one State, such as In Bathroom or In Bedroom, for a period of time, or there are gaps between the segments indicating that they are not contiguous.

4. Fall in Home—Scan from the beginning of the time-line incorporating In-motion, In-Bed, or In-recliner markers. If any of these sensors cease generating signal, and the door marker has not been triggered, create the Fall in Home State if not already created. If already created, extend the end time for this State. If another In-motion, In-Bed, In-recliner marker, or door open/close marker is found while in this State, and these markers continue, or a segment of motion is found after this marker, end the State and it will no longer be extended.

Figure 6:
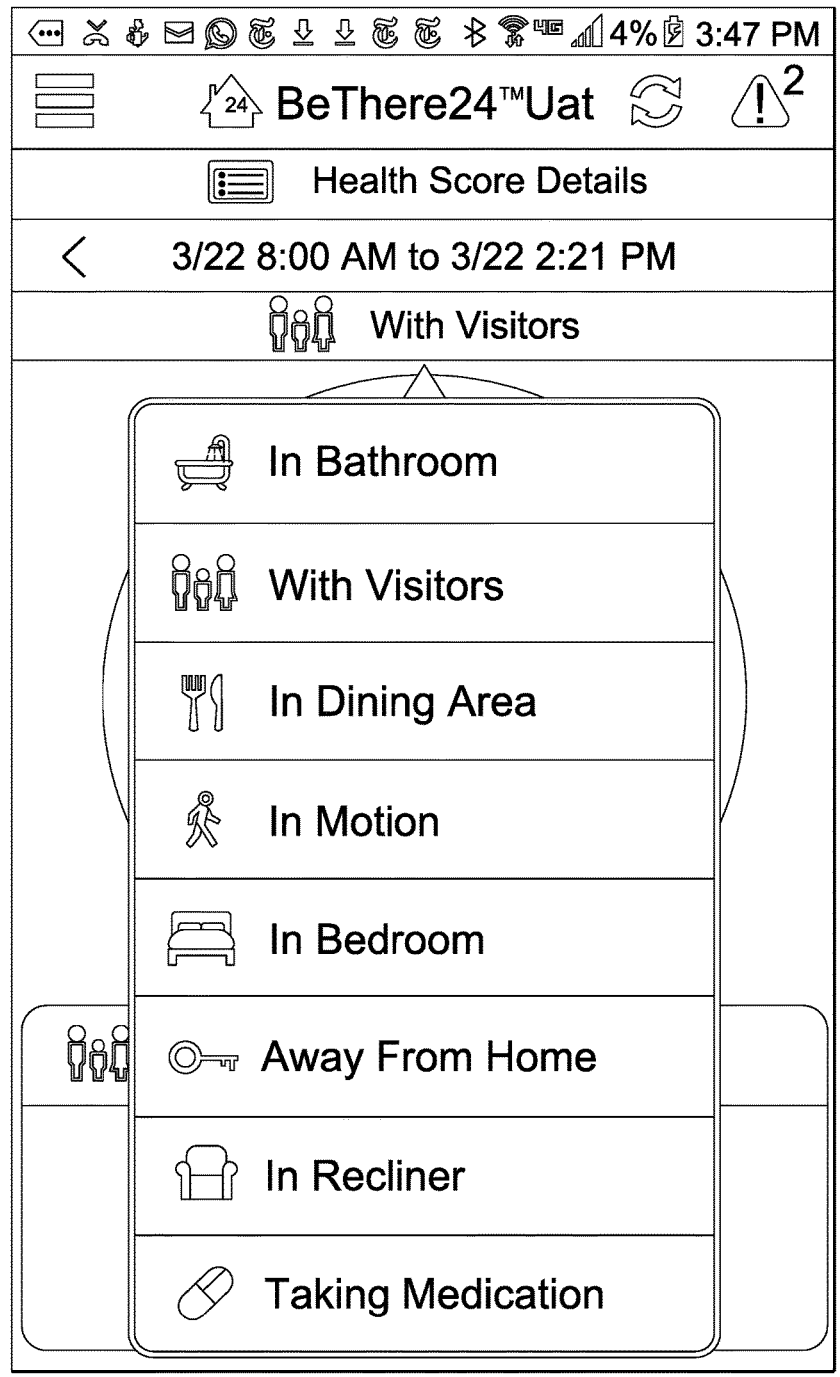
FIG. 6 shows the health score detail screen

The System's Scoring©:

The configuration for each Client being monitored includes Patterns for each of the States defined. A Pattern may be one of three types: duration, frequency or timeframe. The duration Pattern is used to score the length of time an individual is in a State. As an example the In Bed State may have a Pattern per day of 8 hours. The frequency Pattern is used to score the number of times per day an individual is in a State. Examples include Taking Medication may have a Pattern of 3 times per day and In Bathroom may have a Pattern of 8 times per day. The timeframe Pattern is used to determine if a State occurred within a start and end time within any given day. As an example the In Bed State may have a timeframe Pattern of between 8 PM and 8 AM per day. The Patterns are evaluated each day to determine if they have been exceeded. Depending on the percentage deviation from the Pattern, a score is assigned to each State between 1 and 10. Scores 1-3 are considered Red, meaning a Poor outcome. Scores 4-6 are considered Yellow, meaning a Good outcome and scores 7-10 are considered Green, meaning a Very Good outcome. The scores are displayed on the mobile application for each State. Alerts may be sent for Patterns in the Red range. These alerts include sending a text message, an email, a notification or making a phone call to notify a caregiver of the State determined to have a Poor outcome. Initially, Scores are based off of the parameters, duration, frequency, and timeframe that the client being monitored as supplied. Over a period of time during which the system 10 is capturing data, these parameters may be found to have altered, based on real data supplied by the system 10. The client has the choice to accept the new system generated parameters, or remain with those they themselves supplied at the outset of the system's installation. As an example, the duration of a nighttime sleep may have been given initially by the client as 8-10 hours nightly. After 3-4 months of data collection through the system 10, the average sleep time was found to be 7-8 hours nightly. The client has the choice to update the parameter based on the system's suggestion of 7-8 hours, or stay with the originally specified duration of 8-10 hours. The distinction will be in how the system 10 scores the client's night sleep, and when the system 10 would issue an alert as to the client over sleeping, or not sleeping enough. FIG. 6 shows a health Score detail screen States Monitored 1. In Bathroom State: Sensors: Motion Sensor placed on wall or vanity top. Activates monitored using one or more Accelerometer Sensor (affixed with putty or Velcro tape) may include toilet flush handle 44, to record number of times toilet 42 is used; Shower head stem to determine number of times and duration of shower use; Medicine chest or drawer to determine some device use such as shaver or other device's use.

Motion sensor triggers when client enters bathroom area, and sends signal to gateway, data captured by the System is time of entrance. Client proceeds to use toilet 42, motion sensor open (indicating client's presence) until client has sat down on toilet 42. Upon completing toilet 42 use, client flushes toilet 42, Accelerometer sensor triggers client has flushed the toilet 42, and motion sensor triggers resumption of motion. Both sensors send signals to gateway, data captured by the System as toilet 42 flushes, and motion resumes in bathroom area until client leaves the bathroom area, at which time the motion sensor stops triggering and closes (indicating no further presence of client). The System processes the data received as follows: time of entrance to bathroom, motion continues until client sits upon toilet 42, toilet 42 is flushed, motion resumes in bathroom, and then ceases to trigger motion, when time of cessation is recorded. Total time is tabulated, and posted to the System database and Mobile App (see FIG. 1). Tabulated length of time and frequency of times is compared with prescribed Pattern time programmed previously into the system 10 for that particular client (which may be altered by client or caregiver over a period of time based on information of actual Pattern times practiced by client). If total time tabulated is within the Pattern time and frequency, it is designated as normal, and posted to the database and Mobile App. Data is used to determine patterns over time, and posts as the Historical Graphs (see FIG. 3) of the System 10. If total time tabulated is below or exceeds the Pattern time, it is designated as an alert and posted to the database of the System 10 database and Mobile App. If sensors continue to trigger within the bathroom area for a unacceptable length of time, or if they stop sensing movement, and no other sensors in the living environment triggers indicating movement, a Red Alert is reported to the System 10, which triggers monitoring alert to be issued to both caregivers (via the Mobile App) and an independent contract monitoring service with instructions to call in EMS (an Emergency Medical Services).

2. In Dining/Kitchen Area: Sensors: (1) Motion Sensor placed on wall or counter top. Activities monitored using one or more Accelerometer Sensor (affixed with putty or Velcro tape) may include oven use, refrigerator opening, water cooler being dispensed, and micro wave use, amongst other potential uses in the dining area 46.

Motion sensor triggers when client enters dining area 46, and sends signal to gateway, data captured by the System 10 is time of entrance. Client proceeds to use area, motion sensor continues to trigger movement until client has sat down. The opening of the refrigerator or use of a cooking appliance upon which an Accelerometer sensor is affixed will alert the System 10 that meals or snacks are being consumed. Upon exiting the dining area 46, the motion sensor initially triggers the motion of the client exiting the dining area 46, and when out of range from dining area 46 sensor, that sensor will stop triggering, indicating the meal has been finished. The System 10 processes the data received as follows: time of entrance to dining area 46, remains in an open State (triggered) until client leaves dining area 46, and end time is processed, recorded and the total time in dining area 46 is tabulated, and posted to the APP. See FIGS. 1-6. This total time and the frequency of times over a 24 hour period is and compared with prescribed Pattern time programmed previously into the system 10 for the particular client (which may be altered by client or caregiver over a period of time based on information of actual Pattern times practiced). If total time tabulated is within the Pattern, it is designated as normal, and posted to the database and Mobile App (data is used to determine patterns over time, see FIG. 3, Historical Graphs) of the System 10. If total time tabulated falls below or exceeds the Pattern time, it is designated as an alert and posted to the database and Mobile App of the System 10 (see FIG. 1). If sensors continue to triggers within the dining area 46 for a unacceptable length of time, or if they stop sensing movement, and no other sensors in the living environment triggers indicating movement, a Red Alert is reported to the System 10, which triggers monitoring alert to be issued to both caregivers (via the Mobile App) and an independent contract monitoring service with instructions to call in EMS (an Emergency Medical Services).

3. In Bedroom: Sensors: (1Motion Sensor placed on wall or counter top. Activities monitored using one or more Accelerometer Sensor (affixed with putty or Velcro tape) may include: Sensor placed underneath the mattress 40 cover of bed 38 to record sleeping times, and quality of sleep (is client tossing and turning, or having a restful sleep); or TV watching from bed 38 or recliner, with a sensor placed on the bedroom TV remote control device.

Accelerometer sensor triggers when client lie upon bed 38, and sends signal to gateway, data captured by the System 10 is start time of bed 38 use. Accelerometer sensor triggers with movement within the bed 38 and records the amount of restlessness and deeper periods of sleep. The System 10 processes the data received as follows: time of first lying down on the bed 38, initiates bed 38 use time, and continues to pick up movement until such time as client leaves the bed 38, and other sensors situated throughout the living area begin triggering from the movement of client in those other areas. The system thereby processes this as the end of bed 38 use time. Total time is tabulated, and posted to the System database and Mobile App (see FIG. 1). Tabulated length of time and frequency of times is compared with prescribed Pattern time programmed previously into the system for that particular client (which may be altered by client or caregiver over a period of time based on information of actual Pattern times practiced by client). If total time tabulated is within the Pattern time and frequency, it is designated as normal, and posted to the database and Mobile App. Data is used to determine patterns over time, and posts as the Historical Graphs (see FIG. 3) of the System. If total time tabulated is below or exceeds the Pattern time, it is designated as an alert and posted to the database of the System database and Mobile App. If sensors continue to trigger within the bathroom area for a unacceptable length of time, or if they stop sensing movement, and no other sensors in the living environment triggers indicating movement, a Red Alert is reported to the System, which triggers monitoring alert to be issued to both caregivers (via the Mobile App) and an independent contract monitoring service with instructions to call in EMS (an Emergency Medical Services).

Example: There is an Accelerometer stored on a bed 38 associated with the In Bedroom State, which has a 60-minute timer on it. If a Client gets into bed at 21:00 (9 pm), goes to the bathroom at 2:00, and returns to bed at 2:15 and sleeps through until 6:30, the system 10 will record a Signal Row for the Accelerometer Sensor with a Start Time of 21:00 and an End Time of 6:30.

Note: During the entire time in bed the Accelerometer will be sending a mix of on and off signals under the assumption that the Client will be moving around at times in bed during their sleep. This will not interrupt their In Bed State unless the duration of immobility exceeds the configured time. As depicted in the Example, even a short trip to the bathroom will not interrupt their In Bed State.

In Recliner/Living Room State: Sensors: (1) Accelerometer Sensor placed underneath the seat cushion of recliner.

Accelerometer sensor triggers when client sits in recliner, and sends signal to gateway, data captured by the System 10 is start time of recliner use. Accelerometer sensor triggers with movement within the recliner and continues to record the amount of recliner use both in length and frequency of times used. The System 10 processes the data received as follows: time of first sitting down in the recliner, initiates recliner use time, and continues to pick up movement until such time as client leaves the recliner, and other sensors situated throughout the living area begin triggering from the movement of client in those other areas. The system 10 thereby processes this as the end of recliner use time. Total time is tabulated, and posted to the System 10 database and Mobile App (see FIG. 1). Tabulated length of time and frequency of times is compared with prescribed Pattern time programmed previously into the system 10 for that particular client (which may be altered by client or caregiver over a period of time based on information of actual Pattern times practiced by client). If total time tabulated is within the Pattern time and frequency, it is designated as normal, and posted to the database and Mobile App. Data is used to determine patterns over time, and posts as the Historical Graphs (see FIG. 3) of the System 10. If total time tabulated is below or exceeds the Pattern time, it is designated as an alert and posted to the database of the System 10 database and Mobile App. If sensors continue to trigger within the bathroom area for a unacceptable length of time, or if they stop sensing movement, and no other sensors in the living environment triggers indicating movement, a Red Alert is reported to the System 10, which triggers monitoring alert to be issued to both caregivers (via the Mobile App) and an independent contract monitoring service with instructions to call in EMS (an Emergency Medical Services).

5. Taking Medication State: Sensors: (1) Accelerometer Sensor affixed (with putty or Velcro tape) to side of standard retail pill dispenser.

Accelerometer sensor triggers when client moves the pill dispenser, and sends signal to gateway, data captured by the System 10 as taking medication time. Accelerometer sensor triggers each time the pill dispenser is moved and records time each medication was taken, and the frequency of times during each day that medication is taken. These signals are transmitted to The System 10 which processes the data received as follows: each time the pill dispenser is moved records as a separate taking of medication. Total frequency of times and the times of the day are tabulated, and posted to the System 10 database and Mobile App (see FIG. 1). Tabulated frequency of times and times of the day are compared with prescribed Pattern time programmed previously into the system 10 for that particular client (which may be altered by client or caregiver over a period of time based on information of actual Pattern times practiced by client). If total time frequency and times when medication is taken are within the Pattern time and frequency, it is designated as normal, and posted to the database and Mobile App. Data is used to determine patterns over time, and posts as the Historical Graphs (see FIG. 4) of the System©. If total time tabulated is below or exceeds the Pattern time, it is designated as an alert and posted to the database of the System database and Mobile App (See FIG. 17).

Example: There is an Accelerometer stored on a pillbox associated with the Taking Medication State, which has a 3-minute timer on it. If a Client picks up the pillbox to take their meds at 10:00, sets it down at 10:02 to get some water and take the pills, and returns the pillbox to its rightful place at 10:04, the system 10 will record a Signal Row for the Accelerometer Sensor with a Start Time of 10:00 and an End Time of 10:04.

Explanation: The On signal at 10:00 with set a Timer for 3 minutes. Between 10:00 and 10:02 On Signals are received every second, causing the Timer to rest to 3 minutes. When the Off Signals are received starting at 10:02, the time of 10:02 is remembered, but no Signal Row is stored because the Timer is still running. At 10:04, when the pillbox is returned, an On Signal is received, causing the Timer to be reset again for 3 minutes AND the Off Signal time to be discarded. Sometime after 10:04, when the pillbox is no longer in motion and an Off Signal is received, its time, let's says 10:04:15, that time is remembered. When the Timer expires at 10:07:14 (since the last Timer was set for 3 minutes at 10:04:14, 1 second before the Off Timer), a Signal Row will be stored with a Start Time of 10:00:00 and End Time of 10:04:15.

Note: We may opt to drop the seconds when storing the time.

6,7,8. With Visitors, In Motion, and Away from Home: Sensors: With Visitors: (1) Motion Sensor placed on wall or table in front door 18 entrance area; In Motion: Motion Sensor is placed throughout the living area of the clients home/apartment; Away from Home: Accelerometer Sensor, affixed to house key chain, or to the coat worn upon leaving the home.

The architectural design chart, as shown in FIG. 7, describes the flow of information within the monitoring system. It layouts out the four components of the system 10: Configuration System, Mobile App, Alert and Monitoring system, and the data accumulation system. The flow of information begins with sensors generating signals which are translated by the configuration system into data which is then fed to the mobile app and if an alert, to the alert and monitoring system 10. If an alert it issues an alert to the independent monitoring company. All this data is stored in the accumulation system.

All sensors (motion and accelerometers) work the same. The gateway, which receives the signals from the sensors in the home sends a message to the cloud servers each time a sensor detects motion and produces a signal. The cloud service keeps the signal times in memory using a cache, indexed by sensor ID. If a new signal for the same sensor is received, then the end time is updated. An inactivity timer is restarted after each new signal is received. If the timer times out, then the signal with start and end times is stored in the database. This algorithm avoids making constant updates to the database for every signal received. Instead, only fully recorded signals are saved once. This use of the cache, such as a Redis cache, is highly scalable and a unique aspect of the system architecture.

Each time a signal is saved, a state (In Bedroom, In Dining, etc.) for the signal is either created or updated with the new signal end time. This way the states are extended as long as a reasonable amount of activity continues to occur for these sensors. The state extension occurs if the maximum time in this state is within the range of time expected for this state. There are separate matching patterns for each sensor to record this range. A web console allows these patterns to be defined per client.

For scoring, a background process is running to detect if the states exceed a constraint, which is defined in the configuration console for each client. Some constraints are for the whole day, like min/max amount of sleep, and can only be reliably scored after the full day, and some constraints that are defined by a fixed period of time are scored when that period has passed. The alerts are then driven by the score when a constraint has passed unsatisfactorily.

For cross-state analysis, the background process is analyzing the timeline of activity and detecting when states overlap or are in a sequence that indicates a pattern (Away from Home, With Visitors—see the definitions already given above).

By keeping these layers of interpretation independent of each other, maximum accuracy and ease of testing in isolation of each other is achieved. For instance, the scoring alerts logic can be re-run over a previous day's states and this set of algorithms can be tuned independently of the other layers.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A system for monitoring a person in a structure having a first room and a second room with a front door for egress and ingress to the structure and a dining area, the system comprising:
   a first motion sensor disposed in the first room to determine a state associated with first room;
   a first accelerometer disposed in the first room to determine an activity in the first room, the first room has a bed with a mattress and the first accelerometer in contact with the mattress to identify movement of the person on the bed;
   a second accelerometer disposed in the second room to determine an activity in the second room;
   a second motion sensor disposed in the second room to determine a state associated with the second room;
   a door contact for identifying when the door is open;
   a third motion sensor disposed in the dining area to determine a state of the dining area and a third accelerometer disposed at a water source in the dining area to identify when the person takes water from the water source, each motion sensor and each accelerometer and the door contact has a transmitter to transmit a signal;
   a non-transient memory which receives signals from the first and second motion and third sensors, the first and second and third accelerometers, and the door contact;
   a timer in communication with the memory which measures a time span associated with each signal from the first and second and third motion sensors and first and second and third accelerometers and the door contact when the first or second or third motion sensor detected motion and/or the first or second or third accelerometer detected activity and when each time span occurred, and the door contact detected the door was open and when each time span when the door was open occurred, the timer storing each time span and when each time span occurred in the memory, each signal having an identifier identifying whether each signal arose from the first or second or third motion sensor and/or accelerometers or door contact, the identifier of each signal and associated time span being stored in the memory;
   a computer in communication with the memory, the computer taking each time span and when each time span occurred and the identifier of each associated time span and deriving cross state pattern signals, which require an analysis of the signals from the first and second and third accelerometers and the first and second and third motion sensors and the door lock combined, from each time span and when each time span occurred and the identifier of each associated time span and a pattern of each time span and when each time span occurred and the identifier of each associated time span, the computer determines from each time span and when each time span occurred and the identifier of each associated time span for the person and the cross state pattern signals whether the person is acting within an acceptable norm or outside the acceptable norm for the person, and if the computer determines the person is acting outside the acceptable norm of the person, the computer produces an alarm signal, each time span and when each time span occurred and the identifier of each associated time span received over time for at least three days used by the computer to create the acceptable norm, the computer continually updates the acceptable norm over time; and
   an inactivity timer in communication with the memory which consolidates multiple contiguous signals into a signal.

2. The system of claim 1 wherein the computer determines from the signals whether there is another person present in either the first room or the second room and the computer takes into account whether there is the other person present when the computer determines whether the person is acting within the acceptable norm or outside the acceptable norm.

3. The system of claim 1 wherein each signal has a identifier identifying the state or activity triggering the signal, and the state or activity identifier with each signal being stored in the memory.

4. The system of claim 3 wherein the second room has a toilet and the second accelerometer is in contact with a handle of the toilet used to flush the toilet to identify when the person flushes the toilet.

5. The system of claim 4 including a pillbox disposed in the structure and a fourth accelerometer attached to the pillbox to identify when the pillbox is moved by person to take their medication.

6. The system of claim 5 wherein the computer assigns a score to the person indicative of the person's level of activity and motion within a state from the signals.

7. The system of claim 1 includes a monitoring call center remote from the structure and the computer sends the alarm signal to the monitoring call center.

8. The system of claim 1 includes a mobile communication device remote from the structure, the computer sends the alarm signal and the score to the mobile communication device.

9. A method for monitoring a patient comprising the steps of:

measuring with a timer a time span associated with each signal from a first motion sensor disposed in a first room of a structure which determines a state associated with the first room when motion was detected in the first room, a second motion sensor disposed in a second room of the structure which determines a state associated with the second room when motion was detected in the second room, a first accelerometer disposed in the first room which determines an activity associated with the first room when the activity was detected in the first room, a second accelerometer disposed in the second room which determines an activity in the second room when the activity was detected, the structure has a dining area with a third motion sensor disposed in the dining area which determines a state of the dining area and a third accelerometer disposed at a water source in the dining area which identifies when the person takes water from the water source, and including the steps of the third motion sensor sending a signal which indicates that the third motion sensor has detected the person is moving in the dining area, and the third accelerometer sending a signal which indicates the third accelerometer has detected the person is taking water from the water source, and a door contact of a door for egress and ingress to the structure which determines a time span when the door was open, each motion sensor and each accelerometer and the door contact has a transmitter to transmit a signal, the timer storing each time span and when each time span occurred in a non-transient memory with which the timer is in communication, each signal having an identifier identifying whether each signal arose from the first or second motion sensor or accelerometers or door contact, the identifier of each signal and associated time span being stored in the memory, the first room has a bed with a mattress and the first accelerometer is in contact with the mattress and including the step of the first accelerometer identifying movement of the person on the bed;

deriving with a computer in communication with the memory from each time span and when each time span occurred and the identifier of each associated time span and a pattern of each time span and when each time span occurred and the identifier of each associated time span cross state pattern signals, which require an analysis of the signals from the first and second and third accelerometers and the first and second and third motion sensors and the door lock combined; and determining with the computer from each time span and when each time span occurred and the identifier of each associated time span for the person and the cross state pattern signals whether the person is acting within an acceptable norm or outside the acceptable norm for the person, and if the computer determines the person is acting outside the acceptable norm of the person, the computer producing an alarm signal, each time span and when each time span occurred and the identifier of each associated time span received over time for at least three days used by the computer to create the acceptable norm, the computer continually updating the acceptable norm over time.

10. The method of claim 9 wherein the second room has a toilet and the second accelerometer is in contact with a handle of the toilet used to flush the toilet and including the step of the first accelerometer identifying when the person flushes the toilet.

11. The method of claim 10 including a pillbox disposed in the structure and a fourth accelerometer attached to the pillbox to identify when the pillbox is moved by the person to take medication and including the step of the fourth accelerometer sending a signal which indicates the fourth accelerometer has detected the person has moved the pillbox.

12. The method of claim 11 including the step of the computer assigning a score to the person indicative of the person's level of activity and motion within a state from the signals.

13. A system for monitoring a person in a structure having a first room and a second room and a dining area and a front door for egress and ingress to the structure comprising:

a first motion sensor disposed in the first room to determine a state associated with first room;

a first accelerometer disposed in the first room to determine an activity in the first room, the first room has a bed with a mattress and the first accelerometer in contact with the mattress to identify movement of the person on the bed;

a second accelerometer disposed in the second room to determine an activity in the second room;

a second motion sensor disposed in the second room to determine a state associated with the second room;

a door contact for identifying when the door is open;

a third motion sensor disposed in the dining area to determine a state associated with the dining area;

a third accelerometer disposed at a water source in the dining area to identify when the person takes water from the water source, each motion sensor and each accelerometer and the door contact has a transmitter to transmit a signal;

a non-transient memory which receives signals from the first and second motion sensors, and the first and second and third accelerometers and the door contact;

a timer in communication with the memory which measures a time span associated with each signal from the first and second and third motion sensors and first and second and third accelerometers and the door contact when the first or second or third motion sensor detected motion and/or the first or second or third accelerometer and the door contact detected activity and when each time span occurred, the timer storing each time span and when each time span occurred in the memory, each signal having an identifier identifying whether each signal arose from the first or second motion sensor and/or accelerometers and the door contact, the identifier of each signal and associated time span being stored in the memory; and a computer in communication with the memory, the computer taking each time span and when each time span occurred and the identifier of each associated time span and deriving cross state pattern signals, which require an analysis of the signals from the first and second and third accelerometers and the first and second and third motion sensors and the door lock combined, from each time span and when each time span occurred and the identifier of each associated time span and a pattern of each time span and when each time span occurred and the identifier of each associated time span, the computer assigning from each time span and the cross state pattern signals a score to the person indicative of the person's level of activity and motion within a state from the signals, each time span and when each time span occurred and the identifier of each associated time span received over time for at least three days used by the computer to create the acceptable norm, the computer continually updates the acceptable norm over time.

14. A system for monitoring a person in a structure having a first room and a second room and a dining area and a front door for egress and ingress to the structure comprising:

a first motion sensor disposed in the first room to determine a state associated with first room;

a first accelerometer disposed in the first room to determine an activity in the first room, the first room has a bed with a mattress and the first accelerometer in contact with the mattress to identify movement of the person on the bed;

a second accelerometer disposed in the second room to determine an activity in the second room;

a second motion sensor disposed in the second room to determine a state associated with the second room;

a door contact for identifying when the door is open;

a third motion sensor disposed in the dining area to determine a state associated with the dining area;

a third accelerometer disposed at a water source in the dining area to identify when the person takes water from the water source, each motion sensor and each accelerometer and the door contact has a transmitter to transmit a signal;

a non-transient memory which receives signals from the first and second and third motion sensors, and the first and second and third accelerometers and the door contact;

a timer in communication with the memory which measures a time span associated with each signal from the first and second and third motion sensors and first and second and third accelerometers and the door contact when the first or second or third motion sensor detected motion and/or the first or second or third accelerometer and the door contact detected activity and when those time spans occurred, the timer storing each time span and when each time span occurred in the memory, each signal having an identifier identifying whether each signal arose from the first or second or third motion sensor and/or accelerometers and the door contact, the identifier of each signal and associated time span being stored in the memory; and a computer in communication with the memory, the computer taking each time span and when each time span occurred and the identifier of each associated time span and deriving cross state pattern signals, which require an analysis of the signals from the first and second and third accelerometers and the first and second and third motion sensors and the door lock combined, from each time span and when each time span occurred and the identifier of each associated time span and a pattern of each time span and when each time span occurred and the identifier of each associated time span, the computer determining whether the person has fallen down in either the first room or the second room and cannot get up from an acceptable norm, each time span and when each time span occurred and the identifier of each associated time span received over time for at least three days used by the computer to create the acceptable norm, the computer continually updates the acceptable norm over time.

15. A non-transitory readable storage medium includes a computer program stored on the storage medium for monitoring a person having the computer-generated steps of:

reviewing states of a plurality of rooms and activities in the rooms from signals stored in memory, the states obtained from motion sensors in the rooms and the activities of the rooms obtained from accelerometers in the rooms and a door contact, the motion sensors and the accelerometers and the door lock each having a transmitter to transmit a signal, the motion sensors and the accelerometers and the door lock generating the signals corresponding to the states and the activities, the rooms including a first room having a bed with a mattress and the first accelerometer in contact with the mattress to identify movement of the person on the bed, a second room having a second motion sensor and a second accelerometer and a dining area having a third motion sensor disposed in the dining area to determine a state of the dining area and a third accelerometer disposed at a water source in the dining area to identify when the person takes water from the water source and the door contact for identifying when a door is open;

matching a pattern to the states and the activities to create a derived cross state pattern, which requires an analysis of the signals from the first and second and third accelerometers and the first and second and third motion sensors and the door lock combined, about the person;

determining whether the person is acting within an acceptable norm, the acceptable norm formed from the signals stored in the memory over time for at least three days, the acceptable norm being continually updated over time from the signals; and producing an alarm when the person is acting outside the acceptable norm.

\* \* \* \* \*